(12) United States Patent
Larrion

(10) Patent No.: US 9,892,805 B2
(45) Date of Patent: Feb. 13, 2018

(54) UNDERGROUND NUCLEAR POWER PLANT

(75) Inventor: Javier Larrion, San Sebastian-Donostia (ES)

(73) Assignee: SERBEX TECHNOLOGY Y VALORES, S.L., Sun Sebastian-Donostia (ES)

( * ) Notice: Subject to any disclaimer, the term of this patent is extended or adjusted under 35 U.S.C. 154(b) by 491 days.

(21) Appl. No.: 14/382,683

(22) PCT Filed: Jul. 19, 2012

(86) PCT No.: PCT/ES2012/070551
§ 371 (c)(1),
(2), (4) Date: Oct. 27, 2014

(87) PCT Pub. No.: WO2014/013095
PCT Pub. Date: Jan. 23, 2014

(65) Prior Publication Data
US 2015/0131769 A1 May 14, 2015

(51) Int. Cl.
*G21C 13/02* (2006.01)
*G21C 15/18* (2006.01)
(Continued)

(52) U.S. Cl.
CPC .............. *G21C 15/18* (2013.01); *A62B 1/02* (2013.01); *B66B 5/027* (2013.01); *B66B 11/0492* (2013.01); *C06C 5/00* (2013.01); *G21C 9/022* (2013.01); *G21C 13/02* (2013.01); *G21D 1/00* (2013.01); *G21D 1/02* (2013.01); *G21D 3/06* (2013.01); *Y02B 50/146* (2013.01); *Y02B 50/148* (2013.01); *Y02E 30/40* (2013.01)

(58) Field of Classification Search
CPC ........ G21C 15/18; G21C 9/022; G21C 13/02; G21D 1/00; G21D 1/02; G21D 3/06
USPC ................................... 376/273, 274
See application file for complete search history.

(56) References Cited

U.S. PATENT DOCUMENTS 4,000,038 A * 12/1976 Moser .................... G21C 13/00
376/273
4,696,791 A 9/1987 Straub
(Continued)

FOREIGN PATENT DOCUMENTS

FR 2 840 100 A1 11/2003
WO 2012/025589 A1 3/2012

OTHER PUBLICATIONS

International Search Report of PCT/ES2012/070551 dated Jun. 4, 2013 [PCT/ISA/210].

*Primary Examiner* — Jack W Keith
*Assistant Examiner* — Daniel Wasil
(74) *Attorney, Agent, or Firm* — Sughrue Mion, PLLC

(57) ABSTRACT

A nuclear power plant having buried buildings that include a containment building housing a nuclear reactor, a power generation building housing turbines, and a nuclear material storage building. A borated cooling water tank is located above the containment building and can gravity feed water thereto through cooling pipes. Steam exhaust pipes extend from the containment building to the bottom of the water tank. A float and valve arrangement provides seawater to keep the water tank at a constant water level. Horizontal tunnels have manually operated hatches to isolate the different buildings from one another. Vertical tunnels have gravity elevators.

26 Claims, 6 Drawing Sheets

(51) Int. Cl.

| | |
|---|---|
| *G21C 9/02* | (2006.01) |
| *A62B 1/02* | (2006.01) |
| *B66B 5/02* | (2006.01) |
| *C06C 5/00* | (2006.01) |
| *G21D 1/00* | (2006.01) |
| *G21D 1/02* | (2006.01) |
| *G21D 3/06* | (2006.01) |
| *B66B 11/04* | (2006.01) |

(56) References Cited

U.S. PATENT DOCUMENTS

| | | | | |
|---|---|---|---|---|
| 4,971,752 | A | * 11/1990 | Parker | G21C 13/00 |
| | | | | 376/274 |
| 5,223,208 | A | * 6/1993 | Ishimaru | G21C 13/00 |
| | | | | 376/273 |
| 2002/0122526 | A1 | 9/2002 | Hidaka et al. | |
| 2003/0168290 | A1 | 9/2003 | Miyakoshi et al. | |
| 2011/0203877 | A1 | 8/2011 | Tiner et al. | |

\* cited by examiner

UNDERGROUND NUCLEAR POWER PLANT

CROSS REFERENCE TO RELATED APPLICATIONS

This is a National Stage of International Application No. PCT/ES2012/070551 filed Jul. 19, 2012, the content of all of which is incorporated herein by reference in its entirety.

OBJECT OF THE INVENTION

The present invention, a nuclear power plant and safety system with a fuse element, relates to an underground nuclear power plant comprising a safety system, in which a fuse element and a gravity elevator, which are also objects of the present invention, stand out.

Particularly, in the nuclear power plant and safety system with fuse element and gravity elevator object of the invention, the buildings of the power plant subjected to contamination are buried below sea level and under borated water basins, and the plant has a safety system free of electrical and electronic components to act in the event of possible accidents comprising, among others, means for flooding the buildings of the power plant with thermal fuses and gravity elevators for operator evacuation in the event of an emergency.

The present invention will therefore be of interest for the atomic energy industry sector.

DESCRIPTION OF THE STATE OF THE ART

It is well known that the main safety problem in nuclear power plants consists of the lack of cooling of the reactor at a given time, the reactor temperature raising and its fuel reacting uncontrollably.

In the event of an accident due to a lack cooling, the nuclear fuel that is in the reactor can melt, forming what is referred to as corium. Corium is a magma resulting from the elements of the core melting and is essentially formed by a mixture of nuclear fuel, the covering of the fuel elements (zirconium alloy or the like) and the various components of the core with which it comes into contact (rods, tubes, supports, clamps, etc.)

This is one of the most serious accidents that can occur, where it is necessary to cool the reactor to prevent proliferation of the reaction of the fissionable material and the possible release thereof from the containment barriers, usually the reactor vessel and the containment building.

Furthermore, in this process since the fuel rods, control rods and other elements of the vessel melt together, gases are produced that can lead to explosions.

To contain situations of this type, it is necessary to cool with borated water which dilutes the gases generated in the process in addition to blowing off the heat produced.

One of the problems encountered is that the cooling water sometimes does not reach its location either due to a malfunction of the injection pumps for said fluid or due to a lack of power supply for operating them.

A possible solution would therefore be to design power plants where the cooling fluid enters without the need for pumps, so the water tanks must be located at a higher level than the buildings to be cooled.

The present improved nuclear power plant structure provided with a fuse element cooling device entails a step forward as it satisfactorily solves the aforementioned safety problems in conventional nuclear power plants.

Document U.S. Pat. No. 3,712,851-A, describes an underground nuclear power station although it does not disclose all the features of the present invention.

Documents WO-96/20486-A1, U.S. Pat. No. 4,696,791-A and US-2002/122526-A1 describe security systems in nuclear plants with fuse elements that melt when a certain temperature is reached, although they do not work nor have the same features as the fuse element in the present invention.

Documents FR-2840100-A1 and WO2012/025589-A1, refer too to fuse elements in nuclear plants.

DESCRIPTION OF THE INVENTION

The nuclear power plant and safety system with a fuse element object of the present invention that is described below is formed by an original power plant structure, buried at a certain depth, such that it can be cooled in the event of an accident by means of a cooling water tank for emergency situations, preferably containing seawater, located on the surface above the power plant, the cooling water thus being able to circulate due to gravity without the need for pumping. After digging an open pit in the terrain intended for receiving the power plant, the nuclear power plant is built with the corresponding construction criteria and building a concrete compartment for housing it, including earthquake-resistance criteria, and it is subsequently buried using part of the soil that was dislodged while digging using access ramps. This arrangement means that once the service life of the power plant has expired, it is not necessary to dismantle the power plant as occurs with current surface-installed nuclear power plants.

The nuclear power plant with a safety system is primarily based on a particular arrangement of the elements forming the nuclear power plant in combination with different safety elements, largely minimizing electric and electronic components, the most relevant safety element being the arrangement and use of passive thermal fuse elements, which allow giving way to the automatic entrance of water into the reactor core when the reactor temperature reaches a predetermined a set-point temperature.

The nuclear power plant consists of a specific and particular arrangement of the different components or elements of a nuclear plant buried at a site close to the sea as an inexhaustible water source for the purpose of improving safety and likewise including different components or devices to increase safety of the power plant. Specifically, the nuclear power plant object of the invention comprises three buried basic installations, namely: a reactor containment building located underground, a turbine or power generation building also located underground, and at least one waste and/or nuclear fuel warehouse. On the surface, it also has a power plant control building as well as transformers and connection with the high voltage line.

By means of the arrangement of the buildings according to the present invention, the different buildings are separated from one another, allowing the isolation thereof when needed, flooding the containment building and the waste or nuclear fuel warehouses and/or burying said buildings. Specifically, the underground buildings can be buried independently preferably by using pyrotechnic rings located at each entrance and/or exit of each building when an emergency situation occurs. With this arrangement, personnel can control the most dangerous buildings of the power plant in an isolated manner, and in the event of an accident that forces burying or flooding the compromised buildings, the personnel remains far from the radiation. As mentioned, the power plant has at least one nuclear waste and/or nuclear fuel warehouse that remains buried and in communication with the reactor of the installation permanently, therefore the fuel does not have to be transferred out of the power plant. Once said warehouse has been filled, it is flooded and/or buried forever, being isolated from the remaining components of the power plant. The number of nuclear warehouses will be the number necessary for storing the waste that may be generated during the power plant service life. One or some warehouses intended for storing virgin nuclear fuel can also be arranged among these warehouses or buildings.

At least one borated water basin is arranged between the coast and the sea, above the part of the power plant that is buried, in contact with the sea, allowing the cooling and/or flooding of the different components of the power plant in the event of an emergency.

Additionally, and as mentioned, the safety system of the power plant has a fuse element for a nuclear power plant, and more particularly for the reactor of a nuclear power plant, consists of arranging thermal fuses to flood the reactor in the event of high temperature. One fuse can be arranged in the reactor vessel to flood it and another one can be arranged in the core vessel to flood it when a predetermined or set-point temperature for each fuse is reached, and a third fuse can even be arranged to flood the concrete containment building. The safety fuse does not incorporate any electric or electronic mechanism, being completely passive and autonomous such that once the set-point temperature is reached, it melts completely and suddenly (eutectic alloy), allowing the borated water stored in a basin or tank located above the reactor to enter due to gravity (with a passive pressure compensation system so that the column of borated cooling water is not rejected through the flooding pipes). The flooding system is formed by covers or hatches that melt at a specific temperature, causing them to open when a set-point or predetermined temperature is reached in the event of an accident.

Other safety systems are also envisaged in the installation such as an evacuation system for operators who are underground in the event of an emergency formed by at least one gravity elevator, pumping system for drying after flooding one of the buildings and once the accident is controlled; a pipe cleaning system assuring the pipe flow rate; passive valves actuated either by means of floats or loaded springs at a specific pressure; among others.

Therefore, a first object of the invention is a nuclear power plant.

A second object of the invention is a safety system with a fuse element.

A third object of the invention is a fuse element.

A fourth object of the invention is an emergency gravity elevator for the exit of operators.

As mentioned, the power plant is designed such that the core, its vessel, containment and generation buildings, as well as the fuel element and waste tank or storage are below the level of the mentioned cooling water tank, i.e., below sea level, at a sufficient design depth, according to the features of the reactor and the sizing of the design power thereof, the active nuclear part being underground. As it is underground, not only are the effects derived from a possible terrorist attack considerably limited, but it is also possible to permanently bury the power plant by means of pyrotechnic rings located at all the entrances-exits, once the plant is no longer in use, after an accident or in the event that the remaining safety elements fail.

Technology today allows building nuclear power plants with virtually nil probability of a serious accident that may have a repercussion on the habitat and on the health of those living around it. To that end, the present invention takes the following criteria into account:

locating the power plant close to the sea, and
locating reactors underground (attempting to avoid seismic areas), although even in seismic areas, the design proposed in the present invention is valid if it is designed taking earthquake-resistance criteria into account.

The present invention is particularly conceived for fourth generation reactors of not more than 500 MW, limiting the fuel mass in the reactor such that in the event of core fusion, it is easier to put out the fuel mass of a reactor with such power.

Furthermore, to reduce the probability of faults, the design of the control equipment is simplified such that the electronics are limited to armor-clad radiation, temperature, seismic wave controls, etc., and the number of said equipment is reduced, thereby reducing the probability of failures thereof.

As mentioned, the coolant fluid is kept at a specific constant level by means of valve and float opening systems which take the cooling water from main borated water basins. These main basins are built one level lower than sea level and above the buried buildings, in turn having a water feed system using floats that open gate valves to allow the entrance of seawater and of a concentrated boron solution. Said borated solution is stored in secondary basins that pour this solution into the main basins also through gate valves with a float. A continuous, inexhaustible supply of borated water, which is the basic coolant of the power plant, is thus assured for the reactor.

The amount of boron is maintained in these secondary concentrated boron solution basins by means of directly pouring the solution into the basins. Since they are below sea level, it is not possible for the content of the basins to spill into the sea. Also, and to assure that the foregoing does not occur, both the main and secondary basins incorporate covers or plates floating on the water contained therein, said plates being anchored to the bottom of the basins to prevent the water from evaporating and to minimize the mixing of seawater and other elements. Said basins can additionally comprise fixed structures covering their entire surface.

Said basins are responsible for providing cooling water to the different buildings and components of the underground power plant, and mainly to the reactor. The main basins containing borated water also receive at the bottom thereof the exhaust or blow-off pipes for the gases that may be generated in the different containers or buildings, such as the core, the core vessel, the concrete building, waste and nuclear fuel storage buildings, in the event of an accident. The exhaust or blow-off gases thus condense when they reach the basin, being diluted therein. Said ducts or pipes start from high pressure and temperature safety valves installed in the walls of the concrete reactor containment building, in the reactor vessel and in the core vessel.

The power plant object of the present invention is designed so that in the event of an accident in the reactor, the basic safety devices are activated without requiring human action and largely minimizing the participation of electronic and electric components. To that end, it comprises a cooling fuse device as the main safety element which, in the event of an accident or malfunction as a result of which the reactor reaches a high predetermined temperature, hatches or covers comprised in the cooling fuse or thermal fuse will melt, such that when said hatches melt, the reactor is communicated with cooling ducts or pipes that enable introducing borated cooling water into the reactor from the main basins.

These hatches or covers comprised inside the fuse device are made from an eutectic alloy that melts when a specific temperature is reached, allowing the passage of the borated water contained in the cooling ducts or pipes to the reactor containment building, to the reactor vessel and/or to the core vessel, thereby allowing the cooling and dilution of the gases that may have been generated with the melting of the fuel rods or other elements in the reactor.

The eutectic alloy is one which, in the liquid state, reaches a solidification temperature referred to as an eutectic temperature when slowly cooled, where the liquid→alpha solid solution+beta solid solution reaction, called the eutectic reaction, takes place. The fuse devices can be located in the wall itself of the reactor containment building, in the wall of the reactor vessel and/or in the wall of the core vessel, such that the alloy is capable of maintaining in its solid state the required mechanical characteristics of the walls in which it is located, but when exceeding a specific temperature it converts to its liquid state, melting and allowing borated cooling water to flow into the different compartments of the reactor.

The aforementioned high pressure and temperature safety valves installed in the containment building, in the reactor vessel and in the core vessel, have the function of blowing off the high pressure surges that can occur shortly after the borated water starts to enter the containment building, the reactor vessel and the core vessel. The number of water inlet pipes and blow-off pipes must be enough to blow off the gas that is generated and at the same time allow sufficient cooling water, such that as water enters and depending on the temperature, such water evaporates, exiting through the blow-off pipes, allowing the entrance of more cooling water. The number of pipes will be the number necessary for assuring the entrance of cooling water in an attempt to obtain safety redundancy.

In the event that the temperature of the core raises above a set-point or predetermined safety value, the different safety fuses will start to act such that the fuse located in the core vessel will act first, enabling it to be flooded, then the one located in the reactor vessel will act and finally the one located in the containment building will act until the core is cooled.

Once the nuclear accident or emergency situation that led to flooding the different parts of the power plant is controlled, the plant can be recovered by means of extracting the cooling water by means of a pumping station provided for that purpose and carrying the contaminated borated water to the borated water basin through the gas exhaust pipes of the reactor (containment, reactor vessel and core vessel).

As mentioned, the different buildings of the power plant object of the invention are buried and connected by a network of horizontal and vertical tunnels that work like a communication path for the operators in normal operating conditions of the power plant and as an escape route after a possible nuclear accident. Said horizontal tunnels have at different points, mainly at the accesses thereto, steel doors and lead plates that are operated manually and preferably with the aid of counterweights which allow isolating the intermediate areas of the vertical communication escape and safety tunnels in the event of an accident.

The power plant comprises elevators in said vertical tunnels to access the underground buildings and tunnels, these elevators being able to be of two types, some being electrically operated so that in normal operating conditions the operators can go up and down, and others being gravity elevators, without any need for electricity, which only allow going up and are used exclusively in the event of an emergency to escape from inside the power plant. The gravity elevators particularly, which are equivalent to emergency elevators that do not require electricity for their exclusive climbing operation, are preferably installed parallel to the elevator for normal use in the vertical escape tunnels and are designed to operate without a motor and without electricity, since they work due to passive elevation using the force of gravity. These elevators can also be used in other installations and situations in which the escape requires going up.

The gravity elevator, which is a fourth object of the present invention, has all the typical constructive elements of any elevator, including all the safety elements, but does not include a motor and therefore has no electric or electronic components, and it is an elevator that can only be used once for a single climb. The elevator car is anchored to the ground from where the emergency climb must take place by means of a restraint cable which can be cut from inside said car in order to use the elevator in the event of an emergency. In the top part, the elevator car is secured to a main cable at the opposite end of which, after looping around a main sheave, there is located a main counterweight which, when the restraint cable is cut, will cause passive elevation of the car with its occupants inside due to gravity.

The existence of a cutting element, preferably an explosive type cutting element, is contemplated for cutting said restraint cable, the existence of manual shears suitably sized so that they can be used by a person of average constitution for cutting the cable manually further being contemplated. Therefore, if upon activating the explosive cable cutting element, which is preferably a dual charge element, the pyrotechnic element fails both times the cable could be cut manually by means of the mentioned shears. Furthermore, all the cavities and actuators necessary for being able to operate the cable cutter from inside as well as for being able to manually cut the cable are placed in the elevator car.

The tension or weight exerted by the main counterweight is slightly greater, by approximately 20%, than the empty weight of the car plus the weight corresponding to the main cable, such that if one or two people enter the car and cut the restraint cable thereof, they will begin to climb up to the surface by the tractive force exerted by gravity as a result of the excess weight of the main counterweight, which maintains a virtually constant climbing tension.

Additionally, the emergency elevator of the invention also contemplates the existence of a system of secondary counterweights. Therefore, if the number of people entering the elevator car to climb up and escape to the surface means that the tension of the main counterweight is not enough to cause the car to climb, secondary cables which are each attached to a secondary counterweight and to a ground anchor will be anchored to it. Once the necessary secondary cables are anchored, the ground anchors of said secondary cables are cut such that the weight of each secondary counterweight transmits the corresponding complementary climbing tension. This occurs until the climb begins.

In any case, once the car starts to lift up, the climbing speed must be controlled by means of additional safety and climbing control systems provided for that purpose, which, for the sake of safety, will preferably be installed in duplicate. Said systems can comprise:

A brake lever, which is suitably sized so that a person of average constitution can push it with enough force applied to friction blocks which in turn touch a friction track installed along the upward path to thus control the climbing speed.

A speedometer to control the climbing speed.

A system of gear wheels meshing, from inside, with a rack installed along the path, all of this sized so that a person of average constitution can make the elevator climb by transmitting manual force to it. The elevator car will always be out of balance for the climb due to the weight imbalance.

A system of inertia dampers installed at the end of the path (top and bottom) to slow the elevator down such that the inertia withstood by the passengers does not cause vascular damage or damage of any other type.

The secondary pulling cable anchor systems use dual pyrotechnic systems or a lever system sized for a person of average constitution, which close clamps around the cable, having a non-slip system, coated internally with corundum powder, for example.

Mini-oxygen cylinders and masks.

Finally, it should be mentioned that all the steel cables are greased, but furthermore, the restraint cables of the secondary counterweights are sheathed in steel tubes to prevent dangerous jerks and snagging that would occur when climbing without tension and once they have been cut.

In turn, in the present invention it must be taken into account that the safety tunnels for external connections and services are preferably vertical, as is the implementation of the different sets of pipes, which are always arranged vertically.

Likewise, all the entrances and exits are protected by pyrotechnic rings to be able to seal off the power plant in the event of an unrecoverable failure thereof.

Finally, the power plant has a transmission line for the generated electric power coming out of the high-low voltage alternators located in an underground building and taking it to the high voltage transformers located in the exterior for transmitting the power to the transmission and distribution network. This line mainly has a superconductor cable to reduce losses in connection between the alternator and high voltage transformers located on the surface.

DESCRIPTION OF THE DRAWINGS

Attached to the present specification is a set of drawings which, by way of non-limiting example, represent a preferred embodiment susceptible to any variations in detail that do not entail a fundamental alteration of the essential features of the invention.

PREFERRED EMBODIMENT OF THE INVENTION

A detailed description of a preferred embodiment of a nuclear power plant and of a safety system with a fuse element objects of the present invention will be given below.

Figure 1:
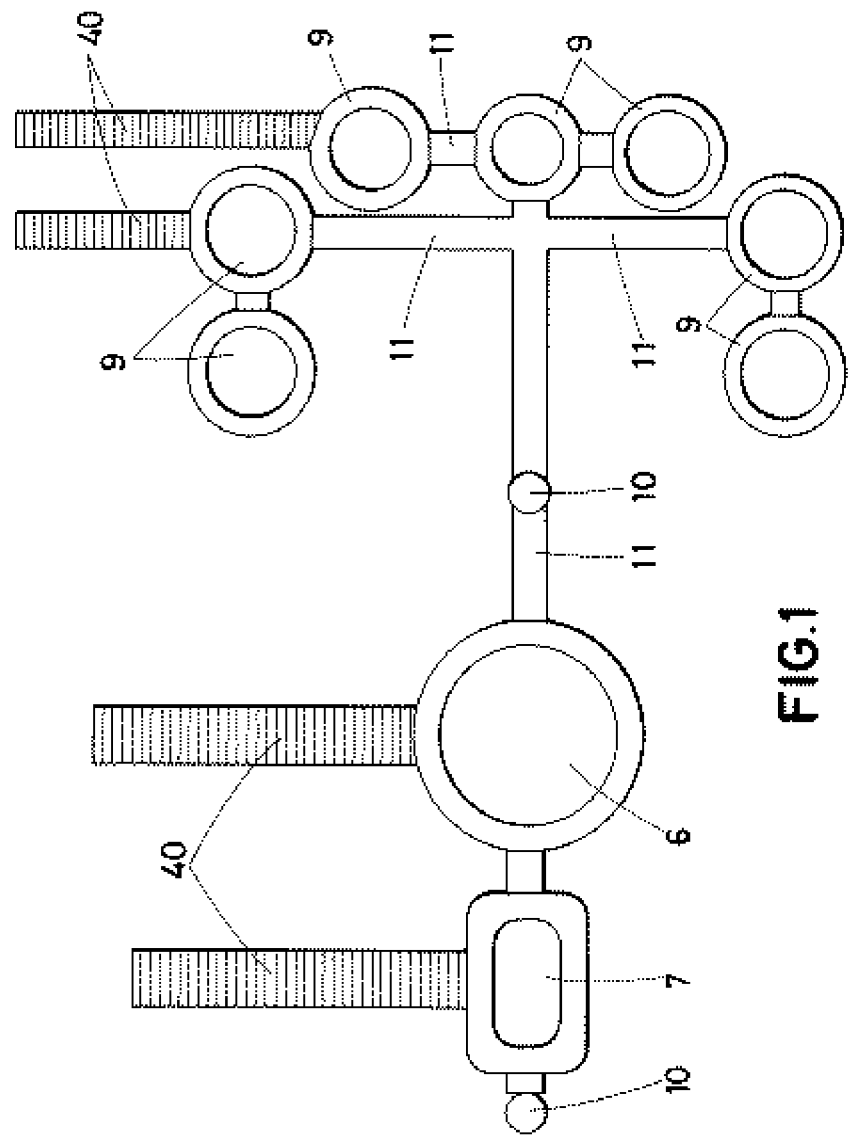
FIG. 1 depicts a schematic plan view of the main buildings buried in a nuclear power plant according to the present invention.

FIG. 1 shows the main buildings and rooms, which will be buried, of the power plant for example in a plan view during the construction of the power plant, in which an open pit has been dug using access ramps 40 to the burying levels and the main buildings, namely, the containment building 6, the generation building 7, the different waste and nuclear fuel buildings or warehouses 9, as well as the tunnels 11 horizontally connecting the different buildings with one another, and the vertical tunnels 10 connecting said horizontal tunnels 11 with the surface, have subsequently been built.

Figure 2:
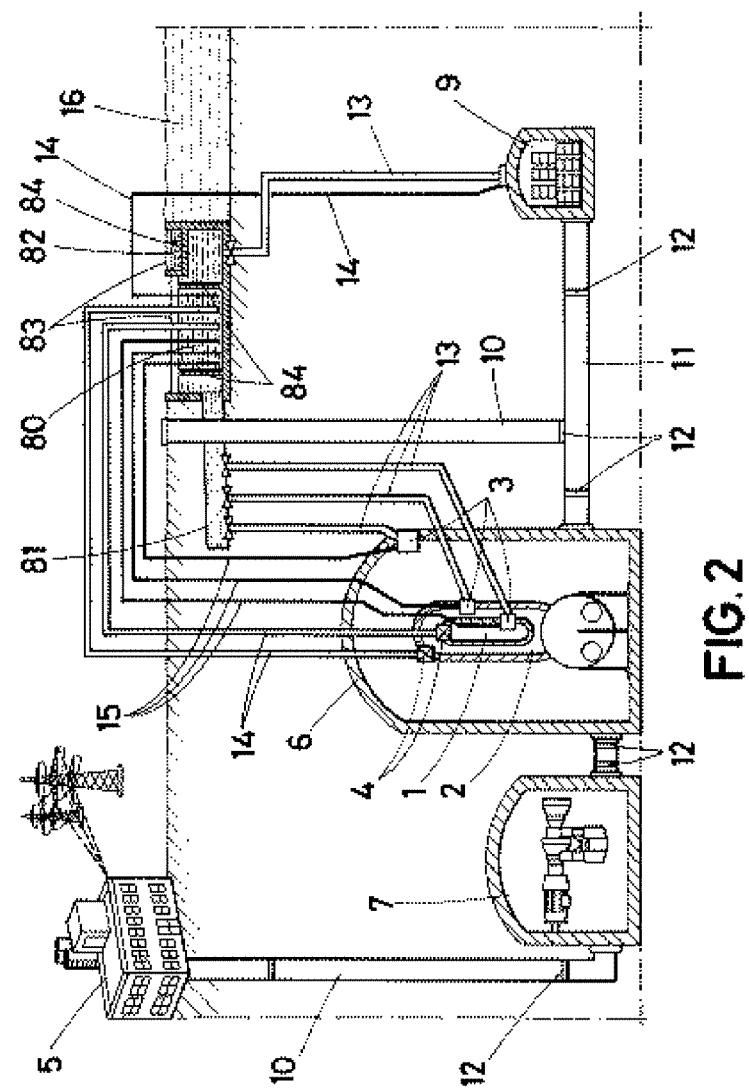
FIG. 2 depicts a schematic side view of the main components of the nuclear power plant.
Figure 3:
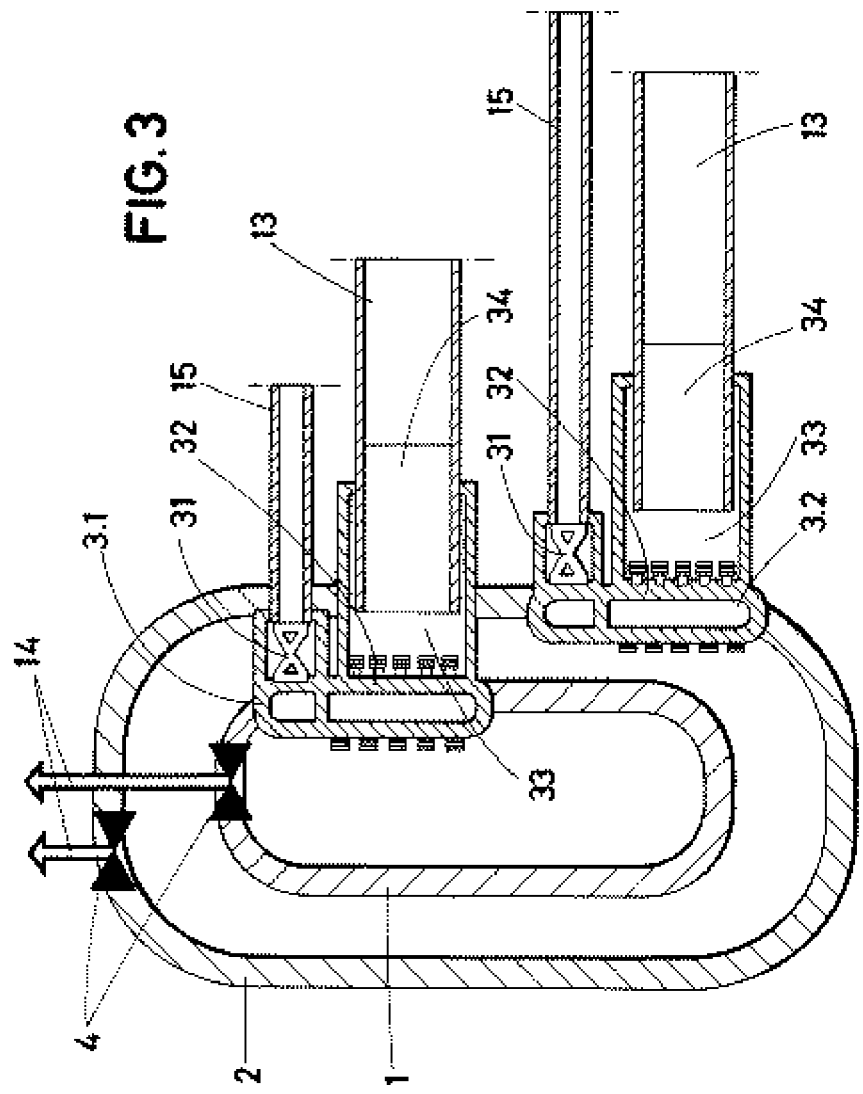
FIG. 3 depicts a schematic side view of the reactor vessel and of the reactor core as well as a detail of the thermal fuses and related components.
Figure 4:
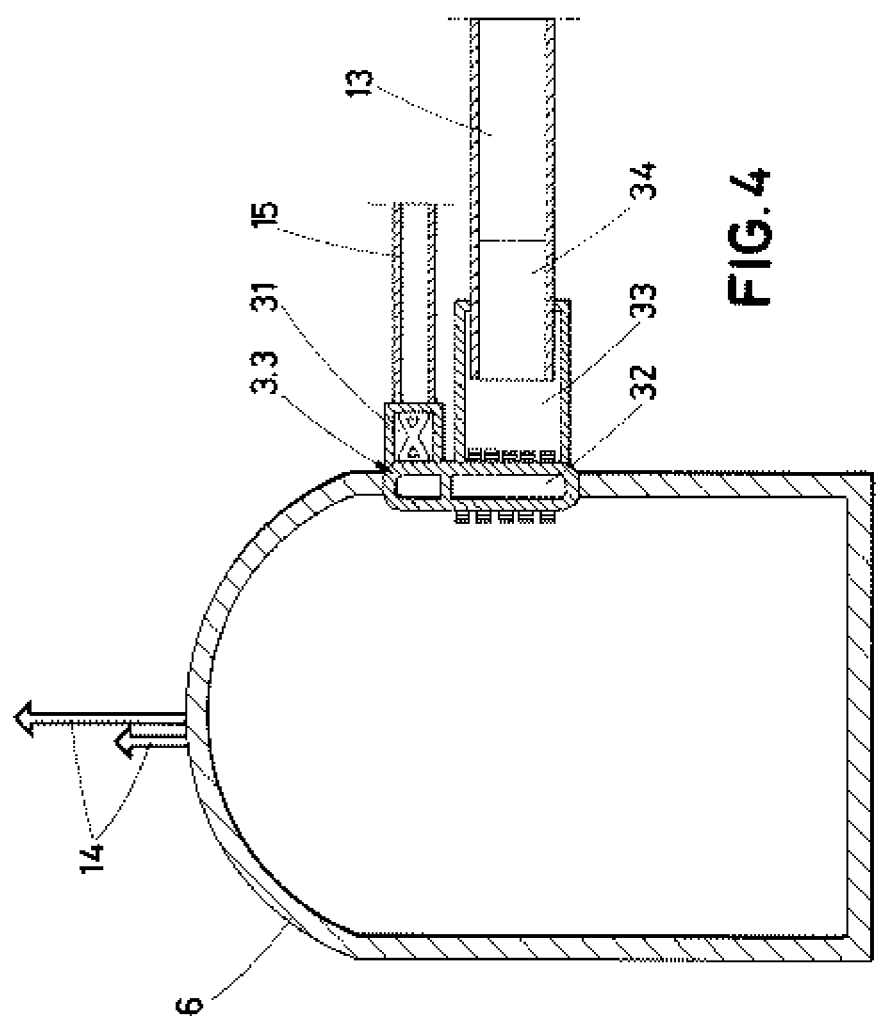
FIG. 4 shows a schematic side view of the reactor containment building and a detail of the fuses and related components.

As can be seen in FIG. 2, which depicts an already built power plant, all the components of the power plant except the transformer and power plant control building 5, are buried, particularly the containment building 6, with the reactor and the core, the generation building 7, and the fuel element and waste buildings or warehouses 9. The control and electrical transformer building 5 located on the surface is electrically connected with the components of the power generation building (7) for transmitting the generated electric power.

The buried components are located below the level of a main cooling water tank or basin 8 which is connected with an inexhaustible water source such as the sea 16 and located at a sufficient design depth, according to the features of the reactor 1 and the sizing of the design power thereof, the active nuclear part being underground, and only the connection and transmission infrastructure 5 for connecting and transmitting the energy produced to the power grid as well as auxiliary components being located on the surface.

To place the power plant below sea level 16, the terrain where the underground power plant is going to be located is excavated, and after building the plant on said terrain according to suitable construction criteria, such as construction of a concrete compartment, and taking into consideration earthquake-resistance criteria, part of the excavated soil is used to bury the power plant, such that said plant is buried and below the level of the main cooling water tank, i.e., below the sea 16, as well as the main basin 8.

The containment building 6 internally comprises the reactor vessel 2 inside which the core vessel with the reactor core 1 is located. The core 1 is the reactor itself and is formed by fissionable fuel, and it is where a nuclear accident can take place if the temperature thereof gets out of control, being able to melt and forming what is referred to as corium or magma resulting from the elements of the core 1 melting, consisting of nuclear fuel, the covering of the fuel elements and the remaining components of the core with which it comes into contact. The core vessel 1 is a pressure vessel built from carbon steel with a thickness between 20 and 25 cm and with other internal steel coverings and it is the first barrier against the exit of corium. The reactor vessel 2 is the second safety container of the core 1 of the reactor and is built from special steel with a thickness not less than 20 cm. The containment building 6 is the final barrier for containing corium in the event of an accident and is built from high-strength concrete with a thickness of at least 150 cm with an inner lead covering. This building is connected with the power production building 7 and with the nuclear fuel and waste warehouses 9.

The different underground rooms or buildings are communicated with one another by means of horizontal tunnels 11 and with the outside by means of vertical tunnels 10, allowing the transit of operators between the different buildings and with the outside. The horizontal tunnels 11 further comprise preferably manually operated safety hatches 12 which allow isolating the different rooms from one another in the event of an emergency for the main purpose of being able to flood the different rooms with the cooling water from the main water tank or basin 8. The vertical tunnels 11 are arranged in different places in the power plant to facilitate the operator exit in the event of an emergency. Said vertical tunnels 11 preferably comprise electric elevators for use during the normal operation of the power plant, and gravity elevators 100 not requiring electric power and only allowing climbing for operator evacuation in the event of an emergency.

Figure 5:
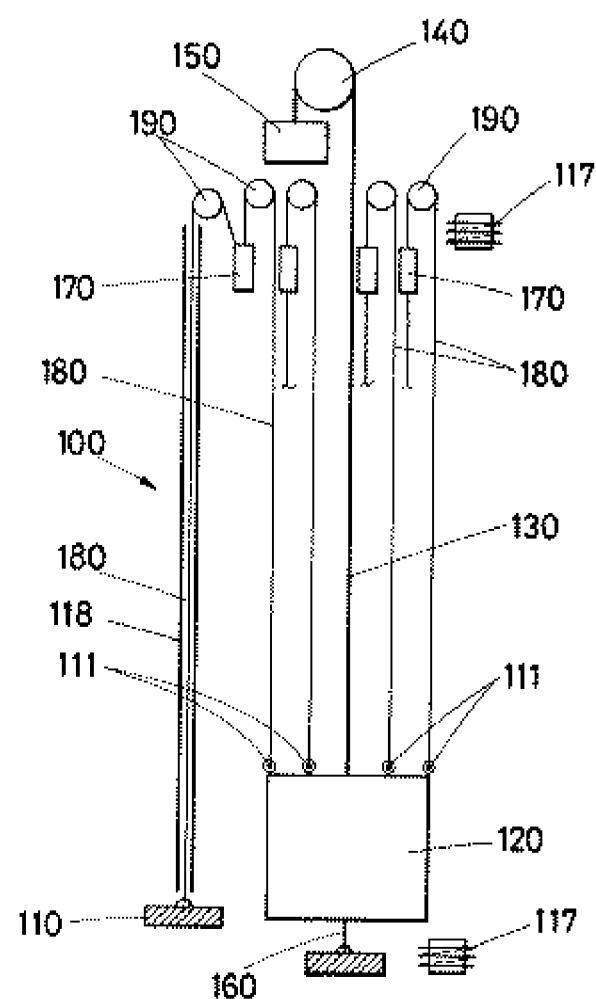
FIG. 5 depicts a schematic elevational view of an embodiment of the emergency elevator object of the invention, the main parts and elements it comprises, as well as the configuration and arrangement thereof, being shown therein.
Figure 6:
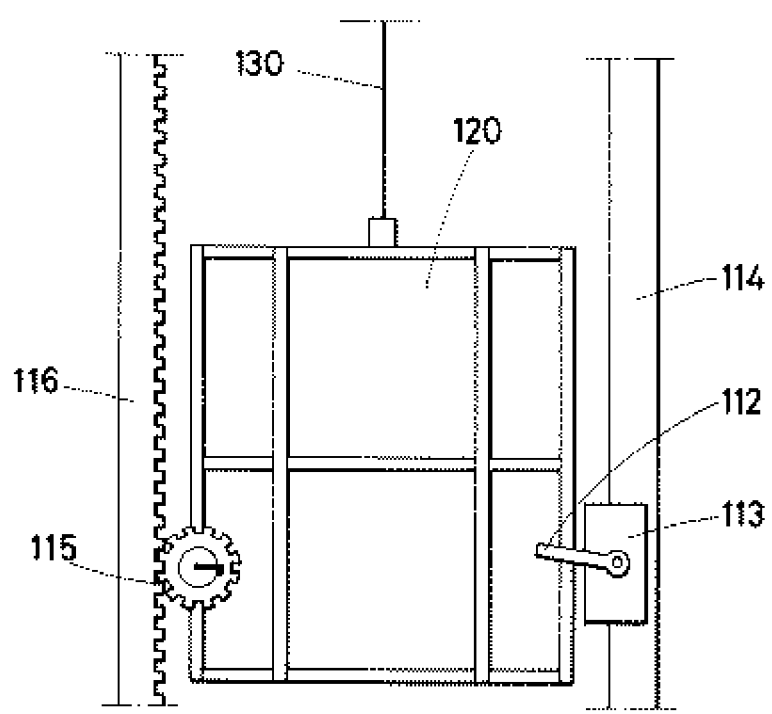
FIG. 6 depicts a schematic elevational view of the car with some of the additional climbing speed control systems.

In relation to the gravity elevators 100, which can only be used for a single climb and are preferably arranged parallel to the ordinary operating elevators, FIGS. 5 and 6 show a diagram of one of said elevators. The elevator 100 in question conventionally comprises a car 120 secured at the top by a main cable 130 looped around a main sheave 140 and incorporates at its opposite end a main counterweight 150, with the particularity that said car 120 is anchored to the ground by means of a restraint cable 160, the weight of said main counterweight 150 being slightly greater by approximately 20%, than the empty weight of the car 120 plus the weight of the main cable 130, such that if one or two people enter the car and cut the restraint cable, the car climbs as the counterweight falls due to gravity.

The elevator has an explosive cutting element for cutting said restraint cable 160 consisting of a dual charge detonating device, as well as a manual cutting element preferably consisting of shears (not depicted). The car 120 further has actuators (not depicted) to operate said cutting elements for cutting the restraint cable 160 from the inside, as well as cavities for accessing them and other additional climb control systems that may be incorporated, as will be explained below.

Additionally, the elevator 100 has a system of secondary counterweights 170 to allow increasing the car capacity. Each of said secondary counterweights 170 is secured to a secondary cable 180 which, looping around a secondary sheave 190, is fixed at one of its ends to a ground anchor 110, whereas at the other end it has means for being fixed to a fastener 111 provided for that purpose in the car 120.

The elevator 100 can have a greater or lesser number of said counterweights and secondary cables and their corresponding ground anchors and fastenings in the car according to the needs in each case. Although FIG. 5 depicts several secondary counterweights 170, only one of them has been depicted in its complete form with its ground anchor 110.

Furthermore, as systems of safety and as systems for controlling the climbing speed the elevator can have:

A brake lever 112 acting on friction blocks 113 which in turn travel on a track 114 installed along the upward path.
A speedometer.
Gear wheels 115 meshing with a rack 116 installed along the path.
Inertia dampers 117 installed at the end of the path.

Furthermore it also has dual explosive cutting elements or a manual lever system (not depicted) for cutting the anchors of the secondary cables 180.

It is important to stress that the end of said secondary cables 180 securing them to the ground anchor 110 are sheathed in steel tubes 118 as a protection system to prevent jerks when climbing without tension. The car 120 also has mini-oxygen cylinders and masks (not depicted).

Continuing with the description of the power plant, the cooling water tank 8 is a main basin containing borated water and it is connected with the sea 16 as an inexhaustible water and cooling source, and it is in turn connected with at least one secondary basin 82 where a borated solution is stored. Said basins are located below sea level 16 and above the buried buildings, being connected with the sea and with one another by means of floats which open gate valves that allow feeding water and maintaining the level thereof. The main basin 8 or an underground appendage 81 thereof is connected with the different buildings by means of cooling pipes 13 which carry the borated water from said basin 8 due to gravity, without the need for pumps. Likewise, the outlets of the pipes used for steam exhaust 14, 15 in the event of an accident which come from the different buildings, mainly the containment building 1, end at the bottom of said basin 8 such that the contaminated steam condenses as it comes into contact with the water of the basin 8.

The main basin 8 and secondary basin 82 comprise covers or plates 83 floating on the water contained therein, said plates 83 being anchored to the bottom of the basins 8, 82. Said plates 83 will preferably be built by means of a stainless steel grid covered with a polymer foam that is thick enough for the plates to float on the water, and that is resistant to solar radiation to prevent evaporation of the water and resistant to etching caused by the seawater. The mentioned plates or covers 83 are anchored to the bottom of the basins 8, 82 by means of cables 84 with high tensile strength resistant to seawater and with a length equal to the maximum height of the walls of each basin 8, 82. Said material can be steel or a polymer. These floating plates 83 minimize the mixture of seawater and of other elements with the borated water of the basins 8, 82. The basins could also incorporate fixed structures covering their surface (not shown).

The cooling pipes 13 connect with the containment building 6 through fuse elements 3 which are incorporated in the walls of the containment building 6, of the reactor vessel 2 and of the core vessel 1. It can evidently be located in only one of the walls of one of the elements. Each fuse element 3 comprises a hatch 32 that opens automatically in the event of nuclear reactor overheating which is formed by an eutectic alloy material 32 having features similar to the walls separating the different elements of the reactor from one another, the core vessel 1, the reactor vessel 2 and the containment building 6, but which are susceptible to melting in overheating conditions and communicate each of the elements 1, 2, 6, with at least one cooling pipe 13, preferably more than one pipe, in an attempt to obtain safety redundancy, which in turn connects with the main basin 8.

The reactor has a double steel vessel and is provided with at least two fuses 3.1, 3.2, one in each of the inner vessel or core vessel 1 and outer vessel or the reactor vessel 2, respectively, connected with independent borated water ducts 13.1, 13.2, each one being able to circulate the borated water between each inner and outer vessel. As described above, the reactor is enclosed in a containment building 6 also preferably provided with a third fuse 3.3 connected to a third pipe 13.3 to allow the entrance of cooling borated water.

As mentioned, the fuse 3 is ceramic or metal a hermetic sealing calculated for being melted when a specific temperature is reached and is integrated in the walls of the vessels 1, 2 or of the containment building 6. It is particularly integrated in said walls by means of a solid anchor either by welding or by screws, forming part of the wall as it has the same features as said wall, namely, the same mechanical strength as any other part of the wall, or of the core vessel 1 or the reactor vessel 2, or of the containment building 6.

The fuses 3 melt suddenly at a predetermined temperature to make way for the borated water that floods and cools the inside of any of the vessels 1, 2 or the containment building 6. The fuses 3 comprise a cover made from an eutectic material 32 and designed for being melt when a predetermined or set-point temperature is reached, followed by an insulating material 33 and an insulating cover 34. The melting point of the eutectic material will range between 2000 and 2500° C. and once the melting temperature is reached, it will melt all of a sudden.

Arranged after said eutectic cover 32 there is an insulating plug 33, after which there is located an insulating cover 34. These two elements serve to prevent the heat of the eutectic cover 32 during the ordinary operation of the power plant from being transmitted to the borated water contained in the pipe 13 which is connected with the thermal fuse 3, this heating being able to cause a dangerous pressure increase in the pipe 13.

In the event of the core 1 overheating and once the melting temperature of the eutectic material is reached, which will be less than the melting temperature of the core 1, the eutectic cover 32 melts suddenly, causing the hydrostatic pressure of the water column of the cooling pipe 13 connected to the borated water basin 8 to push the insulating cover 34 on the thermal insulating plug 33, making them enter the core 1 and opening up the access path of the borated water into the building 6 or vessel 1, 2 to cool the reactor.

The fuse 3 preferably has in its lower part a specific housing for housing a low pressure valve 31, connected with low pressure pipes 15 which open up once the first boil-off gases are produced when the borated water comes into contact with the hot elements of the inside of the vessels 1, 2 or of the building 6. Since the eutectic alloy of the cover 32 melts suddenly due to the effect of the hydrostatic pressure of the water column, at first the water enters the vessels 1, 2 or building 6 because the mentioned low pressure relief valves 31 instantaneously prevent the water column from being pushed upwards or towards the basin 8.

The reactor is also provided with high pressure and temperature safety valves 4 connected with high pressure pipes 14 for blowing off the high pressure surges that may occur with the entrance of borated water into the core 1 and into the core vessel 2.

On the other hand, the power plant has a pumping station for recovering the plant by means of extracting the cooling water into the borated water basin through the reactor gas outlet or exhaust pipes (core and core vessel).

The cooling system using borated water extends not only to the reactor 1, 2 and its containment building 6 but to other buildings such as the power generation building 7 containing the turbines and alternators or the fuel storage building 9 or any other room with radioactive material that must be flooded and cooled in the event of an accident.

On the other hand, the power plant and all its entrances and exits are surrounded by pyrotechnic rings for blasting the plant in the event of an emergency and permanently sealing it off.

Finally, the shape, materials and dimensions may be variable and generally insofar as it is accessory and secondary, provided that it does not alter, change or modify the essential nature of the improvements herein described.

The invention claimed is:

1. A nuclear power plant, comprising at least:
   a containment building inside which a nuclear reactor is located,
   a power generation building inside which turbines and other electricity-generating components are located, and
   a nuclear material building for storing nuclear waste or nuclear fuel,
   said containment building, power generation building and nuclear material building are buried and said containment building and nuclear material building are connected by cooling pipes with at least one cooling water tank located above the containment building and nuclear material building and communicated with the sea and below sea level, wherein water contained in the cooling water tank falls due to gravity when needed to cool or flood said containment building and nuclear material building:
   said nuclear power plant further comprising:
   pipes configured for steam exhaust coming from at least the containment building and ending at a bottom of the water tank, and
   valve and float systems for keeping the water tank at a constant water level.

2. The power plant according to claim 1, wherein the containment building internally has a reactor vessel inside which there is arranged a core vessel which houses the core, at least one wall of at least the containment building, the reactor vessel or the core vessel comprises a fuse element connected with a cooling pipe.

3. The power plant according to claim 1, comprising pipes for exit of steam, said pipes connecting an inside of vessels within the containment building with the cooling water tank, where at least one of a fuse element or a relief valve is disposed between each of said pipes for exit of steam and a corresponding one of the vessels.

4. The power plant according to claim 1, wherein the water tank contains borated water.

5. The power plant according to claim 1, comprising a control and electrical transformer building located above the containment building, power generation building and nuclear material building and electrically connected with the components of the power generation building for transmitting electric power generated from said power generation building.

6. The power plant according to claim 1, wherein the containment building, power generation building and nuclear material building are communicated with one another by of horizontal underground tunnels having manually operated hatches to selectively isolate the containment building, power generation building and nuclear material building from one another.

7. The power plant according to claim 6, comprising vertical tunnels for communicating the containment building, power generation building, nuclear material building or the horizontal tunnels with a surface above ground.

8. The power plant according to claim 7, wherein said vertical tunnels comprise gravity elevators and electric elevators.

9. The power plant, according to claim 1, wherein the containment building internally has a reactor vessel inside which there is in turn arranged a core vessel which houses a core, at least a wall of at least the containment building, the reactor vessel or the core vessel comprising a fuse element incorporated in the wall and connected to one end of a cooling pipe connected at an opposite end to a cooling water tank; the pipes for steam exhaust connecting at least one of the inside of the containment building, the reactor vessel or the core vessel through the fuse element with the cooling water tank.

10. The power plant according to claim 9, wherein the water tank is located above the containment building.

11. The power plant according to claim 9, wherein the water tank is at least one main basin of borated water connected with the sea and with at least one secondary basin for storing a borated solution, both the main basin and the secondary basin being below sea level.

12. The power plant according to claim 9, wherein the fuse element comprises a cover or hatch located therein and is made from an eutectic alloy material, said cover being in contact with an inside of the containment building, the reactor vessel or the core vessel, and insulating material is arranged in contact with the water of the cooling pipe, wherein said insulating material prevents heating of the water in the pipe when the eutectic alloy has still not melted due to overheating inside the containment building, the reactor vessel or the core vessel.

13. The power plant according to claim 9, comprising a respective fuse element in each of the wall of the containment building, in the wall of the reactor vessel and the wall of the core vessel.

14. The power plant, according to claim 1, comprising:
a fuse element placed in at least one of a wall of at least the containment building, the reactor vessel or the core vessel, the fuse element comprising:
an hermetic sealing with an eutectic alloy cover with one end that corresponds with the inside of the wall in which the fuse element is placed, and at an opposite end by an insulating plug followed by an insulating cover, the fuse element connected to a pipe containing cooling water, and
a housing for housing a low pressure valve to be connected with a pipe for steam exhaust and that opens when first boil-off gases are generated as the water comes into contact with hot elements inside the containment building, the reactor vessel or the core vessel.

15. The power plant, according to claim 1, comprising a single-use lift elevator for vertical tunnels and having a car secured at a top of the car by a main cable looped around a main sheave and an opposite end coupled to a main counterweight, said lift elevator operational without electric power using gravitational force, wherein:
said car is anchored to the ground by a restraint cable;
a weight of said main counterweight is greater than an empty weight of the car, plus a weight of the main cable; and
the lift elevator at least one explosive cutting element and at least one manual cutting element for cutting the restraint cable.

16. The power plant, according to claim 15, wherein the car comprises actuators to operate the cutting element of the restraint cable from an inside of the car.

17. The power plant, according to claim 15, comprising at least one system for controlling climbing speed.

18. The power plant, according to claim 15, wherein the weight of the main counterweight is at least 20% greater than a sum of the empty weight of the car plus the main cable.

19. The power plant, according to claim 15, wherein the explosive cutting element is a dual charge detonating element.

20. The power plant, according to claim 15, wherein the manual cutting element is shears.

21. The power plant, according to claim 15, comprising at least one secondary counterweight which is secured to a secondary cable which, looping around a secondary sheave, is fixed at one end to a ground anchor and at another end is fixed to a fastener provided in the car.

22. The power plant, according to claim 21, wherein the car comprises cutting elements for cutting the ground anchor of the secondary cable.

23. The power plant, according to claim 17, the at least one system comprising at least one brake lever acting on at least one friction block which travels along a track installed along an upward path.

24. The power plant, according to claim 17, the at least one system comprising at least one speedometer.

25. The power plant, according to claim 17, the at least one system comprising gear wheels meshing with a rack installed along a path of the car.

26. The power plant, according to claim 17, the at least one system comprising inertia dampers installed at the end of a path of the car.

* * * * *